United States Patent Office 3,424,587
Patented Jan. 28, 1969

3,424,587
METHOD OF TREATMENT OF CRUDE ANIMAL FAT
Alois Mayer, Weisse Lilienstrasse 5, Regensburg, Germany
No Drawing. Continuation-in-part of application Ser. No. 202,076, June 13, 1962. This application Jan. 12, 1965, Ser. No. 425,067
Claims priority, application Germany, July 14, 1961, M 49,666
U.S. Cl. 99—7      9 Claims
Int. Cl. A23k *1/10*

ABSTRACT OF THE DISCLOSURE

Treating crude animal fats to produce animal feed concentrates by drying, communiting, freezing and pulverizing such fats followed by the addition of salt and other additives.

---

This invention is a continuation-in-part of my copending application Ser. No. 202,076, filed June 13, 1962, now abandoned, and refers to a method of treatment of crude animal fats, particularly for converting same into valuable food concentrates which can be advantageously admixed to conventional animal feed. The invention consists in such novel features, arrangements and improvements as may be described in connection with the method herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is the primary object of this invention to provide a method of preparing crude animal fats, particularly beef tallow, hitherto generally considered as waste of little value, for use in animal feed.

Furthermore, it is an object of the present invention to provide a method of treatment of crude animal fats avoiding quality damages, material losses and vitamin destruction.

Another object of the invention is to provide a new method of rendering animal fats readily palatable and digestible to be used as nutrient additions to animal feed.

Various further and more specific purposes, features and advantages will clearly appear from the detailed description given below in which parts will be identified by specific names for convenience, but such names are intended to be as generic in their application to similar parts as the art will permit.

According to the invention crude animal fats are frozen and in that state pulverized. Further according to the invention, crude beef tallow with or without lyphatic glands, as is obtained from the slaughter houses, is hung and dried, so that it can be comminuted in a devil machine. This first step is taken for facilitating a quick and thorough solid freezing in thin layers on cooling plates. The devil machine may have, as an example, an outlet passage of rectangular shape, such as 8 cm. high and 20 cm. wide. The comminuted mass will be slightly compressed in this extrusion orifice forming flat strips of the dimensions indicated above. These strips are frozen on flat plates.

The frozen strips now can be finely pulverized in a rotary cutting machine in which the container rotates at a speed of 16 to 20 r.p.m. and in which the cutter knives rotate with 1,400 to 3,200 r.p.m. The working temperature in the cutting machine is kept low, at least below 0° C., preferably within the limits of —8° C. and 20° C. whereby the higher temperature may be kept for coarser pulverization and the lower temperature for the finer grain size. The operating temperature in the cutting machine may be maintained by a cold gas, either applied and controlled by hand or automatically. Dry Ice has been found to be very handy and practical. No more than approximately 20 kg. frozen $CO_2$ is needed per one ton of pulverized fat. The release of the cold $CO_2$ gas from the Dry Ice which may be kept in an airtight case on the machine, is performed by an electrically heated device using no more than a few watt capacity. This release is quite effective and sensitive. Obviously, cold air or liquified air may be used, but Dry Ice has proven to be economical and at the same time to be useful by preventing oxidization of the pulverized mass.

A sterilization of the pulverized mass is highly desirable and may be performed by treating the mass during the pulverizing step of the method with a bactericidal gas, such as ethylene oxide. Obviously, the poisonous gas must be properly removed by blowing sterile fresh air through and by subsequently evacuating. The sterilization prevents the pulverized product from being spoiled by moulding. It has been found that an amount of 100–250 grams of ethylene per one cubic meter of pulverized mass is sufficient and a time from 2 to 8 hours of application, according to conditions, may be used.

A further step for protecting the product is taken by blending common salt with the pulverized mass in a proportion of 0.4 percent salt for every one percent humidity of the mass. It also is advantageous to add other preserving chemicals enhancing the preservative properties of the salt, such as sodium propionate, calcium propionate, dehydroacetic and ester of 2 - halogenacetocetic acid in quantities ranging from 0.005 part per one thousand parts to 500 parts per one thousand parts of weight. Together with the salt, means for improving the digestibility of the mass may be added, as well as means for the general health of the animals, such as phosphatides, lecithin, polyphosphatides, and similar emulsifiers, vitamins and chemicals for assisting the splitting off the acetic acid. Also iodine, either in the form of the sodium or the potassium compound, and lactic acid, either alone or contained in organic means such as whey powder, skim milk powder and the like are added. Eventually one or more flavoring means, such as cumarin, aldehyde-C16, aldehyde-C18, scatol, indol, vanillin (for example for piglets) are added. It is well understood that these general improving additives are applied in very small amounts. However, it must be recognized that the additives of the aforementioned group of chemically active compounds play an important role. For example, the presence of lactic acid as a preserving as well as a digestive means has been known since a long time, and it occurs most popularly in so-called "sour" foods, such as sauerkraut, in silage, etc. Furthermore, it can be gained by partial fermentation of molasses, glucose, whey, cornstarch, etc. Various product containing up to 50% lactic acid are commercially obtainable in the food and drug industry. The addition of all such preserving means including lactic acid serves a multiple purpose in that it protects the product from being contaminated by destrucive bacillae, from becoming rancid over a reasonable time period and from moulding, as well as protecting the animals, particularly young ones, from contracting diarrhea and the like digestive troubles, when the animal fats are used for feed.

The next step is to blend the prepared pulverized mass into carrier materials which take up 45% to 75% of the fat powder in order to obtain the final feed concentrate. These carrier materials are divided into two basic groups.

The first group comprises organic materials, such as popcorn, puffed wheat, puffed rice, skim milk powder, whey powder, malt germ cuttings, sugar beet cuttings, turnip cuttings, tapioca meal, bakery waste cuttings and the like. The selection of the carrier depends on the desired result, such as high fat content, high digestibility, low price, durability and the like. Popcorn and puffed grains are distinguished by good sterility, very large volume per unit of weight, low humidity content and can take up to 75% pulverized fat in the total weight. Particularly durable are malt germs, sweet whey powder and similar produce. The ingredients of this first group serve both as direct feed and as granular carriers. The second group comprises inorganic materials, such as $SiO_2$, koalin or the like granulated carriers which only serve as granular means for better mixing of the concentrate with conventional feeds. The mixing and blending of the treated pulverized fat with the granular carriers of the groups enumerated above takes place under the same conditions of low temperature and sterilizing atmosphere as during the pulverizing step. The fat concentrate thus obtained in easy-to-handle granulated form is well adapted for being mixed with ordinary feed by the ultimate user. It is suitable for mammals as well as for fish and poultry.

A typical example of a feed mixture for sows, suckling pigs and young pigs is as follows:

| | Percent |
|---|---|
| Fat concentrate | 10 |
| Animal body meal (excluding fish meal and antibiotics) | 30 |
| Toasted crushed soy beans | 10 |
| Linseed meal | 10 |
| Alfalfa green meal | 10 |
| Wheat malt germs | 10 |
| Skim milk powder | 5 |
| Sweet whey powder | 5 |
| Trace minerals mix | 5 |
| Calcium carbonate | 3 |
| Dried yeast | 2 |

A feed mixture for successfully fattening pigs is:

| | Percent |
|---|---|
| Fat concentrate | 5 |
| Animal body meal | 30 |
| Crushed body meal | 15 |
| Toasted crushed linseed oil presscake | 10 |
| Skim milk powder | 10 |
| Sweet whey powder | 10 |
| Malt germs | 5 |
| Crushed oats with molasses | 5 |
| Trace minerals mix | 3 |
| Calcium carbonate | 5 |
| Dried yeast | 2 |

Further feed mixtures incorporate conventional feed such as bran, pollard grit, potatoes, household waste, offals, green fodder and silage in proportions of substantially 20% to 30% of the concentrate with substantially 80% to 70% of the abovementioned regular feed. The higher percentage of the concentrate is selected when the regular feed is of the carbohydrate type having correspondingly less protein content.

While the invention has been described and illustrated with respect to certain preferred examples which give satisfactory results, it will be understood by those skilled in the art after understanding the principle of the invention, that various other changes and modifications with respect to the limitations stated in the examples, may be made without departing from the spirit and scope of the invention, and it is intended therefore in the appended claims to cover all such changes and modifications.

I claim:
1. The method of treating crude animal fats to render it suitable for incorporating into animal feed concentrates, comprising the steps of:
   hanging and drying said crude fats;
   comminuting said dried fats;
   freezing said comminuted fats;
   pulverizing said frozen fats;
   sterilizing said frozen fats during said operation of pulverizing of same;
   intimately mixing said pulverized, sterilized fats with common salt in the proportion of substantially 0.4 percent by weight of substantially every one percent humidity of said pulverized fats; and
   adding to said common salt further additives selected from the groups consisting of flavoring and digestive ingredients.

2. The method of treating crude animal fats for producing feed concentrates according to claim 1, and said group of flavoring ingredients comprising cumarin, vanillin, scatol, indol, aldehyde-C16, aldehyde-C18.

3. The method of treating crude animal fats for producing feed concentrates according to claim 1, and said group of digestive ingredients comprising lecithin, phosphatides, polyphosphatides, sodium iodide, potassium iodide, vitamins, lactic acid.

4. The method of treating crude animals fats for producing feed concentrates, comprising the steps of:
   hanging and drying said crude fats;
   comminuting said dried fats;
   freezing said comminuted fats;
   pulverizing said frozen fats;
   sterilizing said frozen fats during said operation of pulverizing of same;
   mixing said pulverized, sterilized fats intimately with common salt in the proportion of 0.4 percent of weight per every one percent of humidity of said pulverized fats;
   adding to said common salt further additives selected from the groups consisting of flavoring and digestive ingredients; and
   blending said pulverized, sterilized fats with granulated organic dry feed material selected from the group consisting of popcorn, puffed grains, skim milk powder, sweet whey powder, bakery waste cuttings, malt germ cuttings, tapioca meal, sugar beet cuttings and turnip cuttings.

5. The method of treating crude animal fats for producing feed concentrates, comprising the steps of:
   hanging and drying said crude fats;
   comminuting said dried fats;
   freezing said comminuted fats;
   pulverizing said frozen fats;
   sterilizing said frozen fats during said operation of pulverizing of same;
   mixing said pulverized, sterilized fats intimately with common salt in the proportion of 0.4 percent of weight per every one percent of humidity of said pulverized fats;
   adding to said common salt further additives selected from the groups consisting of flavoring and digestive ingredients; and blending said pulverized, sterilized fats with granulated inorganic material selected from the group consisting of silicon oxide and koalin for rendering said concentrate easier to be admixed to other animal feed.

6. The method according to claim 1, wherein said freezing is performed by a cooling gas.

7. Method, according to claim 6, wherein said cooling gas is delivered from Dry Ice.

8. Method according to claim 7, wherein the freezing is performed by placing the Dry Ice in an air tight container and delivering the cooling gas from the Dry Ice by electrically heating said container.

9. Method according to claim 1, wherein said pulverizing is performed by rotating the container with said crude fats with the speed between substantially 16 and 20 revolutions per minute and the cuter knives in said container rotating with a speed between substantially 1,400 and 3,200 revolutions per minute.

References Cited
UNITED STATES PATENTS 2,583,964  1/1952  Otter _____ 99—7

RAYMOND N. JONES, *Primary Examiner.*

J. M. HUNTER, *Assistant Examiner.*

U.S. Cl. X.R.

99—2